(12) United States Patent
Walsh et al.

(10) Patent No.: US 7,599,294 B2
(45) Date of Patent: Oct. 6, 2009

(54) IDENTIFICATION AND RE-TRANSMISSION OF MISSING PARTS

(75) Inventors: Rod Walsh, Tampere (FI); Harsh Mehta, Tampere (FI); Igor Danilo Diego Curcio, Tampere (FI); Toni Paila, Degerby (FI)

(73) Assignee: Nokia Corporation, Espoo (FI)

( * ) Notice: Subject to any disclaimer, the term of this patent is extended or adjusted under 35 U.S.C. 154(b) by 1048 days.

(21) Appl. No.: 10/778,926

(22) Filed: Feb. 13, 2004

(65) Prior Publication Data

US 2005/0182842 A1 Aug. 18, 2005

(51) Int. Cl.
*H04L 12/26* (2006.01)
(52) U.S. Cl. ............ 370/235; 370/230.1; 370/231; 370/394
(58) Field of Classification Search ............ 370/230.1, 370/231, 235, 236, 237, 282, 312, 389, 390, 370/392, 394, 395.1, 395.3, 401, 464, 465, 370/473, 474, 475, 498, 522; 709/231–235; 714/752, 776
See application file for complete search history.

(56) References Cited

U.S. PATENT DOCUMENTS

| 6,061,820 | A  | * | 5/2000  | Nakakita et al. | 714/751 |
| 6,148,005 | A  | * | 11/2000 | Paul et al.     | 370/469 |
| 6,505,253 | B1 | * | 1/2003  | Chiu et al.     | 709/235 |
| 6,678,855 | B1 | * | 1/2004  | Gemmell         | 714/752 |
| 7,296,205 | B2 | * | 11/2007 | Curcio et al.   | 714/748 |
| 7,423,986 | B2 | * | 9/2008  | Grayson et al.  | 370/312 |
| 7,430,617 | B2 | * | 9/2008  | Walsh et al.    | 709/247 |

FOREIGN PATENT DOCUMENTS

| JP | 2002-124992  | 5/1990  |
| JP | 05-219056    | 8/1993  |
| JP | 09-270790    | 10/1997 |
| KR | 2004-0007745 | 1/2004  |
| WO | WO 03105353  | 12/2003 |

OTHER PUBLICATIONS

Adamson et al., NACK-Oriented Reliable Multicast Protocol (NORM), Jun. 2003, RMT Working Group Internet Draft, Chapters 1, 4 and 5.*
Adamson, Bormann, Handley and Macker, RMT Working Group, "*NACK-Oriented Reliable Multicast (NORM)*," Internet Draft, Jun. 2003, Expires Dec. 2003; retrieved on May 18, 2005 from Internet; Chapters 1.0; 4.3.1 and 5.0.

(Continued)

*Primary Examiner*—Michael J Moore, Jr.
*Assistant Examiner*—Mark A Mais
(74) *Attorney, Agent, or Firm*—Alfred A. Fressola; Ware, Fressola, Van Der Sluys & Adolphson

(57) ABSTRACT

The invention relates to a method for file delivery in a system capable of one-to-many transmission, the method comprising transferring one or more data blocks from a sender to at least one receiver, identifying a data block expected to be received but not received at all or incorrectly received at the receiver, and taking action to re-transmit said data block. In the method, said identification is performed on the basis of a block number, an encoding identifier and certain other identification information.

33 Claims, 3 Drawing Sheets

OTHER PUBLICATIONS

Paila, Luby, Lehtonen, Roca and Walsh, "*FLUTE—File Delivery over Unidirectional Transport,*" RMT Internet Draft, Expires May 14, 2004; retrieved on May 18, 2005 from Internet; entire document.

Adamson, Bormann, Handley and Macker, RMT Working Group, "*NACK-Oriented Reliable Multicast Protocol (NORM),*" Internet Draft, Jan. 2004, Expires Jul. 2004, 69pp.

Paila, Luby, Lehtonen, Roca and Walsh, RMT, "*FLUTE—File Delivery over Unidirectional Transport,*" Internet Draft, Dec. 11, 2003, Expires Jun. 10, 2004, 32pp.

Luby, Gemmell, Vicisano, Rizzo and Crowcroft, Network Working Group, "*Asynchronous Layered Coding (ALC) Protocol Instantiation,*" RFC 3450, Dec. 2002, 34pp.

Adamson, Bormann, Handley and Macker, RMT Working Group, "*NACK-Oriented Reliable Multicast (NORM) Building Blocks,*" Internet Draft, Nov. 2003, Expires May 2004, 21pp.

Curcio and Wlash, Nokia, NTT DoCoMo, "*FLUTE for MBMS Downloading,*" 3GPP TSG-SA4#29, Tdoc S4-030772, Agenda Item 6.5.4.1, meeting held Nov. 24-28, 2003 in Tampere, Finland.

\* cited by examiner

IDENTIFICATION AND RE-TRANSMISSION OF MISSING PARTS

FIELD OF THE INVENTION

The invention generally relates to multicast and broadcast transmission technology and services, that is, services with one data source (or sender) and at least one receiver.

BACKGROUND OF THE INVENTION

For one-to-many (i.e., point-to-multipoint) services over systems such as IP multicast, IP datacasting (IPDC) and multimedia broadcast/multicast services (MBMS), file delivery (or discrete media delivery or file download) is an important service. Many of the features for delivering files over point-to-point protocols such as file transfer protocol (FTP) and hypertext transfer protocol (HTTP) are problematic for one-to-many scenarios. In particular, the reliable delivery of files—that is the guaranteed delivery of files—using similar one-to-one (i.e., point-to-point) acknowledgement (ACK) protocols such as transmission control protocol TCP is not feasible.

The Reliable Multicast Transport (RMT) Working Group of the Internet Engineering Task Force (IETF) is in the process of standardizing two categories of error-resilient multicast transport protocols. In the first category, reliability is implemented through the use of (proactive) forward error correction (FEC), that is, by sending a certain amount of redundant data that can help a receiver in reconstructing erroneous data. In the second category, receiver feedback is used in order to implement reliable multicast transport. Asynchronous Layered Coding (ALC, RFC 3450) is a protocol instantiation belonging to the first category, while the NACK-Oriented Reliable Multicast (NORM) protocol presents an example of the second category. The details of ALC and NORM protocols are discussed in more detail in publications entitled "Asynchronous Layered Coding (ALC) Protocol Instantiation" (RFC 3450) and "NACK-oriented Reliable Multicast Protocol" (Internet Draft) prepared by the Working Group of the IETF. The contents of these publications are fully incorporated herein by reference.

Access networks on which these protocols can be used include, but are not limited to, wireless multiple-access networks such as radio access networks of the Universal Mobile Telecommunications Services (UMTS) system, wireless local area networks (WLAN), Digital Video Broadcasting-Terrestrial (DVB-T) networks and Digital Video Broadcasting-Satellite (DVB-S) networks.

Briefly, ALC protocol is a proactive FEC based scheme that allows receivers to reconstruct mangled packets or packets that have not been received. ALC protocol uses FEC encoding on multiple channels, allowing the sender to send data at multiple rates (channels) to possibly heterogeneous receivers. Additionally, ALC protocol uses a congestion control mechanism to maintain different rates on different channels.

ALC protocol is massively scalable in terms of the number of users because no uplink signalling is required. Therefore, any amount of additional receivers does not exactly put increased demand on the system. However, ALC protocol is not 100% reliable because reception is not guaranteed, thus it is generally not described as robust.

NORM, in turn, specifies the use of negative acknowledgement (NACK) messages in order to signal which packets of data (or otherwise defined "data blocks") expected to arrive at the receiver were not received at the receiver (or were received incorrectly). In other words, receivers employ NACK messages to indicate loss or damage of transmitted packets to the sender. Accordingly, a receiver that "missed" some data blocks from a data transmission can send a NACK message to the sender requesting the sender to re-transmit the missed data block or blocks. NORM protocol also optionally allows for the use of packet-level FEC encoding for proactive robust transmissions.

File Delivery over Unidirectional Transport (FLUTE) is a one-to-many transport protocol that builds on FEC and ALC building blocks. It is intended for file delivery from sender(s) to receiver(s) over unidirectional systems. It has specializations which make it suitable to wireless point-to-multipoint (multicast) systems. The details of FLUTE protocol are discussed in more detail in the publication entitled "FLUTE— File Delivery over Unidirectional Transport" (Internet Draft) prepared by the above-mentioned Working Group of the IETF. The contents of this publication are fully incorporated herein by reference.

NACK messages are not generally NORM specific, but they can also be used in connection with other protocols or systems. When using NACK messages in connection with FLUTE sessions (or in other sessions using a transport layer protocol especially directed to support one-to-many transmission) the identification of the missing packets (or blocks) is an important issue. The usage of protocols intended for one-to-one (or point-to-point) transmission, such as TCP, and their acknowledgement methods are not necessarily feasible here. For example, the use of TCP acknowledgement methods in a one-to-many system would produce a considerable amount of overhead. Accordingly, there is a need for reliably identifying the packets not received in a one-to-many scenario so that accurate re-transmission can be performed.

SUMMARY OF THE INVENTION

It has been observed that when using NACK messages to reliably transmit data over a multicast/broadcast channel, the identification of the missing packets is an important issue. This involves the maintenance of information regarding the state of the transmission as well as the identification of blocks that need to be re-transmitted. It has been observed that in terms of response time, NACK requests (sent by a receiver and received by a sender) can be divided into 2 categories:

a) NACK requests that are received immediately or soon after the initial transmission, and can be satisfied within the same session (e.g., a FLUTE session or similar).

b) NACK requests that are received after a session has expired and the data is required to be re-transmitted through another session. In this case, the other session may either be of the same point-to-multipoint protocol (e.g., a new FLUTE session established after an old FLUTE session has been expired) or a session using another protocol which may be a point-to-point or point-to-multipoint protocol (e.g., FTP, HTTP, etc.).

In both cases, it is important to accurately identify the block(s) to be re-transmitted.

According to a first aspect of the invention there is provided a method for file delivery in a system capable of one-to-many transmission, the method comprising:

transferring one or more data blocks from a sender to at least one receiver;

identifying a data block expected to be received but not received at all or incorrectly received at the receiver;

taking action to re-transmit said data block, wherein the method comprises:

performing said identification on the basis of a block number, an encoding identifier and other identification information.

In accordance with an embodiment the other information comprises a set of session parameters and/or a transmission object identifier.

In accordance with another embodiment the other information comprises information of the file and/or blocking information.

According to a second aspect of the invention, there is provided a receiving device for file delivery in a system capable of one-to-many transmission, the receiving device comprising:

means for receiving one or more data blocks from a sender;
means for identifying a data block expected to be received but not received at all or incorrectly received;
means for taking action in order to cause re-transmission of said data block, wherein
said means for identifying are configured for identification of said data block on the basis of a block number, an encoding identifier and other identification information.

According to a third aspect of the invention, there is provided a sending device for file delivery in a system capable of one-to-many transmission, the sending device comprising:

means for transmitting one or more data blocks to at least one receiver; and
means for re-transmitting a data block expected to be received but not received at all or incorrectly received at the receiver, said data block having been identified on the basis of a block number, an encoding identifier and other identification information.

According to a fourth aspect of the invention, there is provided a system capable of one-to-many transmission, the system comprising:

means for transferring one or more data blocks from a sender to at least one receiver;
means for identifying a data block expected to be received but not received at all or incorrectly received at the receiver;
means for taking action to re-transmit said data block, wherein
said means for identifying are configured for identification of said data block on the basis of a block number, an encoding identifier and other identification information.

According to a fifth aspect of the invention, there is provided a software application executable in a receiving device for file delivery in a system capable of one-to-many transmission, the software application comprising:

program code for causing the receiving device to receive one or more data blocks from a sender;
program code for identifying a data block expected to be received but not received at all or incorrectly received;
program code for causing the receiving device to take action in order to cause re-transmission of said data block, wherein
said program code for identifying is configured for identification of said data block on the basis of a block number, an encoding identifier and other identification information.

According to a sixth aspect of the invention, there is provided a software application executable in a sending device for file delivery in a system capable of one-to-many transmission, the software application comprising:

program code for causing the sending device to transmit one or more data blocks to at least one receiver; and
program code for causing the sending device to re-transmit a data block expected to be received but not received at all or incorrectly received at the receiver, said data block having been identified on the basis of a block number, an encoding identifier and other identification information.

The software applications may be computer program products, comprising program code, stored on a medium, such as a memory.

According to yet another aspect of the invention there is provided a method for file delivery in a one-to-many transmission system, the method comprising:

transferring one or more data blocks from a sender to at least one receiver;
identifying missing data blocks to be re-transmitted by using block number and/or encoding identifier ranges.

This aspect of the invention can be understood as a separate aspect or as an aspect to be implemented in connection with any other aspect(s) of the invention.

The block number ranges and encoding identifier ranges may be contiguous or non-contiguous.

A receiving device, sending device, system and software applications may be implemented respectively.

Dependent claims relate to embodiments of the invention. The subject matter contained in dependent claims relating to a particular aspect of the invention is also applicable to other aspects of the invention.

BRIEF DESCRIPTION OF THE DRAWINGS

Embodiments of the invention will now be described by way of example with reference to the accompanying drawings in which.

DETAILED DESCRIPTION

The subject-matter contained in the introductory portion of this patent application may be used to support the detailed description. In the following the File Delivery over Unidirectional Transport (FLUTE) protocol is used as an example without an intention to limit the present invention to involve FLUTE only. Any other suitable protocol capable of one-to-many multicast file delivery is also applicable in the context of the present invention.

Figure 1:
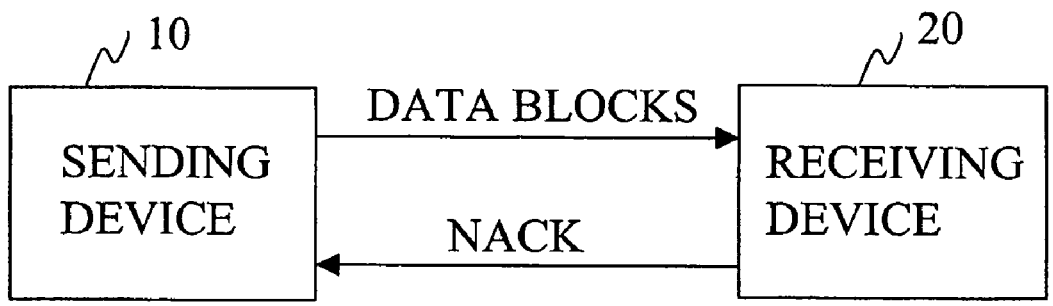
FIG. 1 shows a sending device and a receiving device communicating in accordance with an embodiment of the invention.

FIG. 1 shows a sending device and a receiving device communicating in accordance with an embodiment of the invention. The sending device 10 is a server, IP-based device, DVB device, GPRS (or UMTS) device or similar device that may optionally use proactive forward error correction, such as an ALC mechanism, for sending multicast data blocks (or packets) to the receiving device 20. The receiving device 20 sends negative acknowledgement NACK messages (or requests) to the sending device 10 concerning missing blocks (blocks not received or received incorrectly). In response to the NACK message(s), the sending device 10 re-transmits missing blocks to the receiving device 20 in a FLUTE session (the same session as the original FLUTE session established for original transmission, or a subsequent FLUTE session).

Alternatively a session using another protocol than FLUTE may be used. In certain contexts, a re-transmission session is called a repair session.

Data is transferred as objects. For instance, a file, a JPEG image, a file slice are all objects. A session is established between the sending device 10 and the receiving device 20 for file (or data) delivery. A single session may include the transmission of a single object or multiple objects. Different identifiers are used to identify the objects and sessions. Each session is identified by the address (e.g., an IP address) of the sender (source), the address of the receiver (destination) and the transmission session identifier (TSI) or similar. It is also possible to use only the address of the sender or receiver and the TSI. Further, the transmission object identifier (TOI) or similar is used to indicate the object to which the packet being transmitted in a particular session pertains. For instance, a sending device 10 might send a number of files in the same session using a TOI of 0 for the first file, 1 for the second and so on.

Each data block has a number called source block number (SBN) or similar, which identifies each block. Blocks are represented by a set of encoding symbols. An encoding symbol identifier (ESI) or similar, in turn, indicates how the encoding symbols carried in the payload of a data packet (or block) were generated from the above-mentioned object (e.g., file).

Figure 2A:
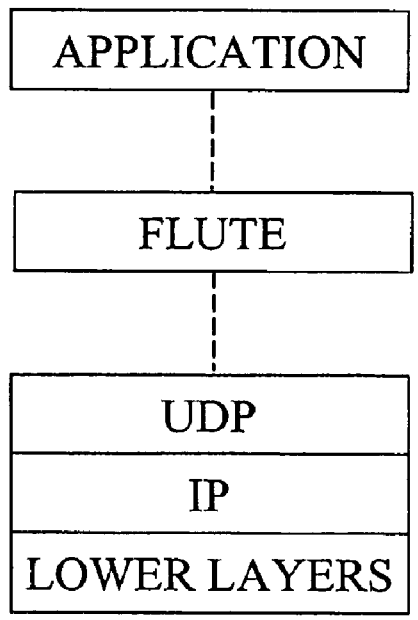
FIG. 2A illustrates a simplified protocol architecture in accordance with an embodiment of the invention.

FIG. 2A illustrates a simplified protocol architecture in accordance with an embodiment of the invention. According to this embodiment, the protocol stack to be implemented for the sending device 10 and the receiving device 20 comprises an application layer, FLUTE protocol layer, UDP and IP layers and lower layers. FLUTE protocol layer is built on top of ALC protocol instantiation of the layered coding transport (LCT) building block (not shown). Also FEC building blocks can optionally be used. FLUTE protocol layer together with NACK messages is intended to provide reliable data block transmission from the sending device 10 to the receiving device 20. This protocol architecture can be used for one-to-many transmission (for both one-to-many "first transmissions" as well as one-to-many re-transmissions).

Figure 2B:
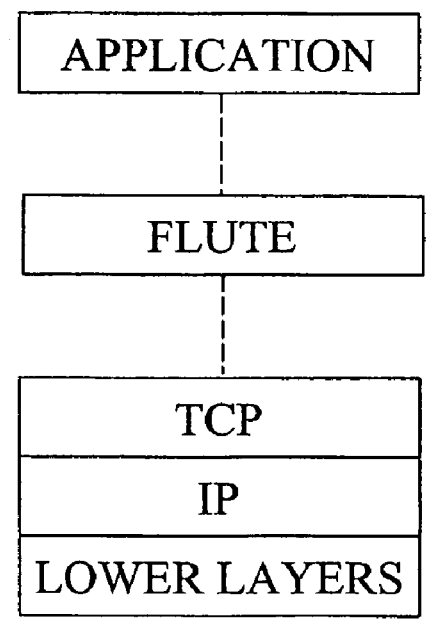
FIG. 2B illustrates a simplified protocol architecture in accordance with another embodiment of the invention.

Alternatively, in an embodiment a TCP layer can be used instead of the UDP layer (see FIG. 2B). This applies for the case in which a separate point-to-point repair session (here: TCP session) is used for one-to-one (i.e., point-to-point) re-transmissions. Description of different re-transmission methods is presented later in this description.

In the following, different cases for a receiver to identify a set of missing packets (or blocks) is presented. There are two methods of identifying the FLUTE source block or encoding symbol (and, as a result, one or a series of packets):

Identification Method A

Identification is performed on the basis of the SBN and the ESI, as well as FLUTE session parameters (source address, destination address and the TSI) and the TOI (Transmission Object Identifier). Typically, it is the sending device that generates this information while transmitting FLUTE packets. The information is contained in ALC/FLUTE packets.

Identification Method B

Identification is performed on the basis of the SBN and the ESI, as well as on the basis of the file (i.e., the URI of the delivered file), file parameters (file length and the encryption code (such as MD5 code), the blocking algorithm used and the blocking parameters (maximum source block length, encoding symbol length and the file length). The information is taken from a FDT (File Description Table) or similar, which contains these parameters/information. The information is typically carried as a separate object by the FLUTE session.

As can be seen, both identification methods A and B make use of a block number and an encoding identifier and, additionally certain other identification information. Identification method A uses details directly obtainable from the session itself (here: FLUTE session), whereas identification method B uses also other information (e.g., information on the delivered file).

Independently of the identification method, there are the following two possibilities to perform the subsequent re-transmission:

Re-Transmission Method A

FLUTE session is used for the re-transmission (re-transmission may be effected within the same (ongoing) FLUTE session or in a separate FLUTE session). The method may be based on point-to-point or point-to-multipoint transmission.

Re-Transmission Method B

Using a separate session for re-transmission with a method other than FLUTE, e.g., HTTP, SMS, FTP, SAP, GPRS, etc. The method may be based on point-to-point or point-to-multipoint transmission.

Accordingly, the two different identification methods and the use of FLUTE or another protocol for the re-transmission produces four different combinations for identifying and re-transmitting packets:

1. Identification using method A and re-transmission using method A;
2. Identification using method B and re-transmission using method B;
3. Identification using method A and re-transmission using method B; and
4. Identification using method B and re-transmission using method A.

The above assumes that during transmission, each encoding symbol is contained within one and only one packet. However, if multiple encoding symbols are included within the same packet or if a single encoding symbol is spread over multiple packets, then the encoding symbol (and the part of the packet containing an encoding symbol or the series of packets containing a single encoding symbol respectively) needs to be appropriately identified.

The first combination (A+A) is considered useful in a situation in which re-transmission of packets is desired on the same channel, using the same sender (or server) information and within the same FLUTE session, within a short time span. The FLUTE sender can, for example, buffer (or temporarily store) all the SBNs and ESIs sent within the last 5 minutes. If a re-transmission request (NACK) arrives within this time period, this method is applicable.

The second combination (B+B) is considered useful in a situation in which re-transmission is needed after the current session has ended, possibly long after it. As buffering all the long-term information about transmissions during the session might be infeasible for the sending device 10, in a non-limiting embodiment a "third party server" or a repair server (or just simply a separate server (not shown)) is configured to buffer the transmission information. This server may, for example, be co-located with the original sender (e.g., an MBMS (Multimedia Broadcast/Multicast Service) server, also called BM-SC (Broadcast Multicast-Service Centre)), or, for example, be a separate server within an UMTS operator's network. This server can then re-transmit the missing packets at a later time. An example of this is a server that re-transmits missing packets over GPRS or UMTS at night, when the GPRS (UMTS) access may be cheaper. Re-transmission can also start just after the transmission session has ended, or at any random time after that and before data is consumed by the receiving device 20, in order to avoid overloading the sending device 10 with re-transmission requests (NACKs) from many receiving devices 20. The idea of having a separate repair server also applies to other embodiments.

The following steps illustrate an exemplary embodiment of the preceding:

1. The sending device 10 transmits one or more files using a FLUTE session.
2. At the end of the session, the receiving device 20 sends one or more NACK message(s) for all packets that it did not receive. This NACK message signifies the start of a new session.
3. The sending device 10 re-sends all the data requested by the receiving device 20 in a new session.
4. The newly created session is then closed at the sending device 10 and at the receiving device 20.

As an example relating to step 2 above, the following method may be used to send NACK for data using specific SBN and ESIs over HTTP:

http.//www.3.com/greatmusic/number1.mp3?mbms-re16-flute-repair&SBN=123;ESI=234.

Here SBN and ESI are the Source Block Number and Encoding Symbol ID of the parts of the file that are to be negatively acknowledged (that is, NACKed) for. The file name here is number1.mps and the SBN and ESI NACKed for are 123 and 234, respectively. In the above HTTP query, the SBN and ESI fields can also be used to NACK for SBN and ESI ranges. For instance, http://www.3.com/greatmusic/number1.mp3?mbms-re16-flute-repair&SBN=123&126&127;ESI=234-238.

The above NACKs for file number1.mp3, SBN 123, 126 and 127 and ESI 234 to 238. Several other such combinations are possible, for example:

a) SBN;ESI_list (e.g., . . . &SBN=123;ESI=234,236,238)
  (a list of missing ESIs within the same SBN)
b) SBN;all_symbols (e.g., . . . &SBN=123)
  (all ESIs belongings to SBN 123 are missing)
c) SBN-range;all_symbols (e.g., . . . &SBN=123-129)
  (all ESIs belonging to the SBN range 123-129 are missing)
d) "non-contiguous ranges"
  d.1) (e.g., . . . &SBN=123;ESI=234+SBN=200;ESI=23)
    (ESI 234 belonging to SBN 123 and ESI 23 belonging to SBN 200 are missing), or
  d.2) ( . . . &SBN=123-129+SBN=200;ESI=23-59+SBN=200;ESI=101)
    (all ESIs belongings to the SBN range 123-129 and all the ESIs in the range 23-59 belongings to the SBN 200 and the ESI 101 belonging to the SBN 200 are missing).

It is possible that a NACK contains a request for retransmission of one or more packets. It is more efficient to include all packet requests into a single NACK request if this is transmitted reliably over the network channel. Otherwise, all the packets can be requested across several NACKs.

The following describes yet another embodiment of the invention for re-transmitting packets that have been missed during a certain FLUTE session. This embodiment is independent of the preceding four identification/re-transmission combinations.

In this embodiment the FLUTE session context (SBN, ESI, TSI and TOI) are stored for later non-FLUTE use. This context can then be used to transmit data using a non-FLUTE method. To implement this, it is considered useful to have an identifier, e.g., a multicast ID, which identifies the 'session context' uniquely. The 'session context' here may, for example, be all the identifiers of the session combined to form a unique identifier for the session. It should be noted that although the re-transmission method used here is the same as in the combination method 4 described earlier, there is a difference with regard to the storage of session information. In an embodiment, the session information is stored by both the sending device and the receiving device and is communicated between the sending device and receiving device outside of a FLUTE session.

According to yet another embodiment of the invention, the receiving device 20, rather than calculating the packets that need re-transmitting, calculates the byte ranges (of the original object transmitted by the sending device 10) that need re-transmitting. Also in this embodiment, the SBN and ESI can be used in the identification. The receiving device sends a NACK message for the not-received byte ranges. It is possible that there are multiple byte ranges within the same packet. In response to the NACK message, the sending device 10 re-transmits the byte ranges from the original object. Instead of byte ranges, the receiving device 10 may also calculate bit ranges as well as word ranges and request them to be re-transmitted.

In another embodiment of the invention, the missing redundant, rather than source, encoding symbols of source block(s) are identified and all or a subset are re-transmitted. NACKs sent from receiving devices 20 to sending devices 10 (there may be more than one sending device) are thus based on redundant symbols. This scheme is particularly applicable to systematic FEC schemes where only encoded "redundant symbols" are transmitted and unencoded "source symbols" are not and, typically, a certain threshold number of redundant encoding symbols of each source block are needed to complete the source blocks and thus reconstruct the file.

For instance, in an exemplary FEC scheme the case may be that there are 1000 symbols transmitted by the sending device, for each source block, and exactly 500 is the threshold number required to be received by the receiving device to complete (or correctly perform) the delivery of the file. However, in this exemplary case, the receiving device gets only 490 symbols (assuming that only encoding symbols from a single source block are missing; if encoding symbols from several source blocks are missing, then the following calculation needs to be carried out for each source block that has symbols missing). In such a scenario, there are the following possibilities which apply per source block of each file:

1. The receiving device identifies the missing symbols; the receiving device works out how many are enough to complete the block; the receiving device NACKs for a subset of the missing symbols (enough to complete it); the sending device resends these symbols,
2. The receiving device identifies the missing symbols; The receiving device NACKs all the missing symbols; the sending device resends all these symbols,
3. The receiving device identifies the missing symbols; the receiving device NACKs all the missing symbols; the sending device works out how many are enough to complete the block; the sending device selects a subset of missing symbols (numbering "enough"); the sending device resends these symbols,
4. The receiving device acknowledges (ACKs) the received symbols; the sending device identifies the missing symbols; the sending device resends all these symbols.
5. The receiving device ACKs the received symbols; the sending device identifies the missing symbols; the sending device works out how many are enough to complete the block; the sending device selects a subset of missing symbols (numbering "enough"); the sending device resends these symbols.

The selection of combining NACKs (or ACKs) so that more than one symbol, more than one source block and/or more than one file are referenced in each NACK is a matter of per application optimization.

The definition of "enough" symbols may be exactly the number required to complete the threshold number (10 out of 510 in the above example) especially when the repair can be effected reliably by some other means (like TCP transport), or may be more than that to allow for losses on the link (e.g., in the example above 51% of symbols were lost, so if the same communications channel were to be used again one could expect something similar, so maybe it would be more appropriate to resend 10*(100/51)=20 symbols. Also, an additional safety margin may be added (e.g., to deal with burst errors), so if this were 3 symbols, then one could repair with 23 symbols even though only 10 need to "get through". Both this multiplier (here: "100/51") and constant (here: 3) can assume uniform packet loss (as in those examples) or depend on the loss pattern of the original transmission. For example, a sending device can analyse the distribution of lost symbols and if it were non-uniform (e.g. 3 consecutive symbols are often lost approximately per every 20 symbols) then some (e.g., 3 per 20 symbols) additional symbols can be added (resulting in 23 symbols again in this example).

One further example would be that after identifying said threshold number of 10 symbols of a source block required to complete the file, the receiving device sends a NACK to the sending device asking for the re-transmission of these 10 symbols. The sending device may resend these symbols as they have been cached earlier or, in an alternative method, the sending device performs a repeat of FEC encoding on the file(s) and source blocks corresponding to the symbols and re-transmits these symbols. This latter method enables initial transmission and repair server functionality to be decoupled, and possibly deployed into distinct server equipment.

Another further example would be that the receiving device sends a NACK for each of the 510 missing symbols (or, in an alternative embodiment acknowledges that it has received 490 symbols). The sending device then re-transmits only the 10 missing symbols or re-transmits all the 510 missing symbols. The re-transmission may be of previously cached symbols or newly FEC-encoded symbols.

In addition to the re-transmission (or repair) request, sent from receiving device(s) to sending device(s), based on identifying symbols, the request may specify one or more byte ranges in file, and/or their source blocks. This is applicable if the received symbols are sufficient to work out the missing byte ranges from blocks.

It has been described that point-to-point or point-to-multipoint transmission can be used for re-transmitting missing packets. A clarifying embodiment is directed to point-to-multipoint re-transmission (or repair). In this embodiment, each receiving device concerned sends a negative acknowledgement (NACK) message to the sending device over a point-to-point connection (or session). Depending on the number and/or content of NACKs received at the sending device, the sending device makes a decision:

1) whether to send the missing block(s) separately to each receiving device using point-to-point connection(s); or
2) whether to send the missing block(s) using a point-to-multipoint connection (that is, multicast or broadcast or similar).

If a large number of receiving devices send NACK requests related to the same missing packets, the second option can be more desirable. In this way, with one single re-transmission, it is possible to make multiple receivers' repairs and save resources.

Figure 3:
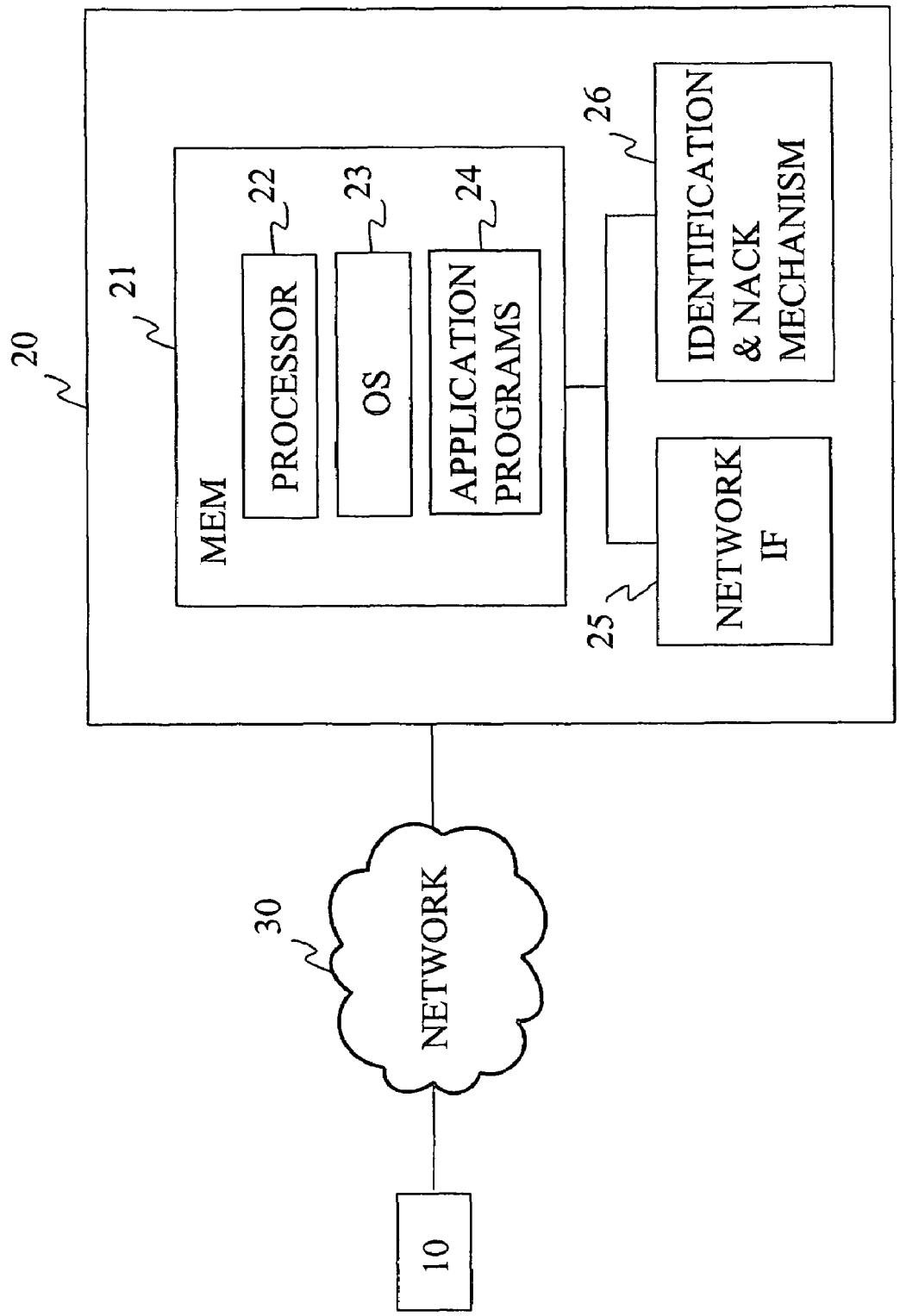
FIG. 3 shows a system and details of a receiving device in accordance with an embodiment of the invention.

FIG. 3 shows a system and details of a receiving device in accordance with an embodiment of the invention. The system comprises the sending device 10 a transmission network 30, e.g., an IP network or another fixed network, a wireless network or a combination of a fixed and a wireless (cellular) network etc., and the receiving device 20. The receiving device 20 can be a cellular telephone, a satellite telephone, a personal digital assistant or a Bluetooth device, WLAN device, DVB device, or other similar wireless device. The device 20 includes an internal memory 21, a processor 22, an operating system 23, application programs 24, a network interface 25 and an identification & NACK mechanism 26. The internal memory 21 accommodates the processor 22, operating system 23 and application programs 24. The identification & NACK mechanism 26 enables the identification of data packets and transmission of NACKs or data to the sending device 10 in response to missing or mangled data blocks in a data transmission. The device 20 is able to communicate with the sending device 10 and other devices via the network interface 25 and the network 30.

Figure 4:
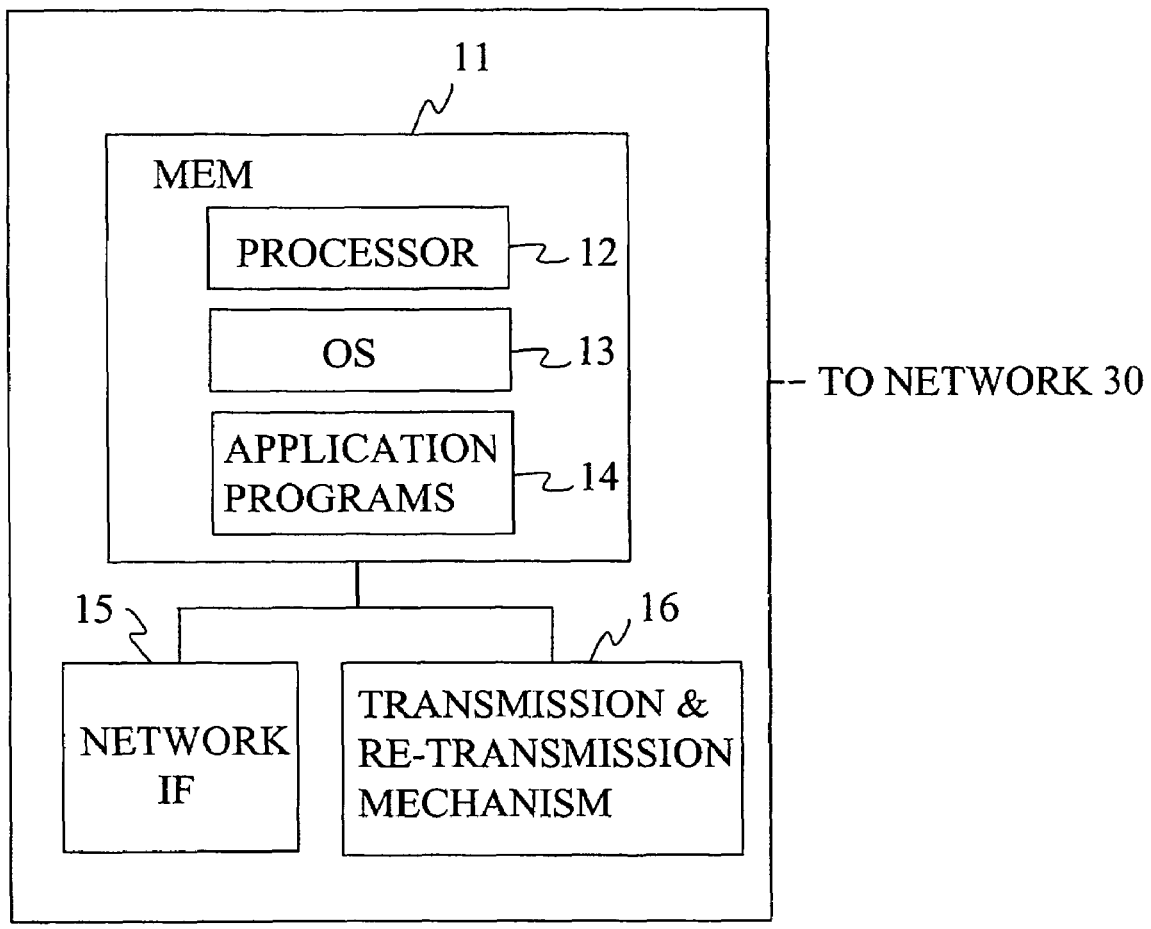
FIG. 4 shows a sending device in accordance with an embodiment of the invention.

FIG. 4 shows a sending device 10 in accordance with an embodiment of the invention. The sending device 10 can be, for example, a network server or any suitable device intended for file (or media) delivery. The device 10 includes an internal memory 11, a processor 12, an operating system 13, application programs 14, a network interface 15 and a transmission & re-transmission mechanism 16. The internal memory 11 accommodates the processor 12, operating system 13 and application programs 14. The transmission & re-transmission mechanism 16 enables the transmission of data packets and re-transmission of data packets in response to NACKs received from the receiving device 20. The device 10 is able to communicate with the receiving device 20 and other devices via the network interface 15 and the network 30.

Procedures relating to identification of missed data packets and re-transmissions thereof can be implemented by software. A computer program product comprising program code stored in the receiving device 20 and run in the processor 22 can be used to implement the procedures at the receiving end of the transmission session, whereas a computer program product comprising program code stored in the sending device 10 and run in the processor 12 can be used to implement the procedures at the transmitting end.

In the following, advantages of the embodiments of the invention are discussed. Embodiments of the invention provide a new framework for re-transmitting missing data.

As has become clear based on the preceding, this framework allows the re-transmission of missed data in the following scenarios:

Within a session of FLUTE, when the information regarding the missing packets is still available at the sending device and the NACK is received by the sending device within a short time frame.

When it is required to re-transmit missing packets outside of the original FLUTE session in which they were originally transmitted. This re-transmission may occur using FLUTE or using another transmission method.

Some of the advantages that embodiments of the invention provide are:

A method of identifying (contiguous or non-contiguous) missing blocks (or packets) uniquely A method of identifying missing blocks (or packets) of one (or multiple) file(s) over the same (or a number of) session(s).

A method of identifying and re-transmitting missing blocks (or packets) over a number of transmission protocols.

The ability to re-transmit missing packets at a suitable time. Where the suitable time is chosen using a number of possible criteria (such as available bandwidth, cheaper carrier, etc.)

The ability to re-transmit the missing packets reliably (if the underlying transport protocol is reliable) and with a single repair transfer session.

Accordingly, embodiments of the invention presents methods for identifying and sending negative acknowledgement (NACK) messages for missed blocks either within or outside a one-to-many multicast session.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claim is:

1. A method for file delivery in a system capable of one-to-many transmission, the method comprising:
   transferring one or more data blocks of a file from a sender to at least one receiver;
   identifying a data block of said file that is expected to be received but not received at all or incorrectly received at the receiver, said identifying said data block is performed on the basis of a block number, an encoding identifier and other identification information, including information of the file, wherein said information of the file includes at least one of uniform resource identifier of the file and file parameters; and
   taking action to re-transmit said data block.

2. The method of claim 1, wherein said other identification information comprises a set of session parameters.

3. The method of claim 1, wherein said other identification information comprises a transmission object identifier.

4. The method of claim 1, wherein a session-based protocol directed to file delivery over unidirectional transport and capable of one-to-many transmission scenario is used.

5. The method of claim 4, wherein said protocol is File Delivery over Unidirectional Transport and said block number is a source block number, said encoding identifier is a encoding symbol identifier, a set of session parameters to be used in identification are selected from a group consisting of: a source address, a destination address and a transmission session identifier, and wherein a transmission object identifier as defined by File Delivery over Unidirectional Transport is used in the identification.

6. The method of claim 1, wherein said other identification information comprises blocking information.

7. The method of claim 1, wherein a session-based protocol directed to file delivery over unidirectional transport and capable of one-to-many transmission scenario is used.

8. The method of claim 7, wherein said protocol is File Delivery over Unidirectional Transport and said block number is a source block number, said encoding identifier is a encoding symbol identifier, and said file parameters include at least one of file length and encryption code, and wherein blocking information to be used in identification is selected from a group consisting of: a blocking algorithm used and blocking parameters, encoding symbol length and file length.

9. The method of claim 1, wherein the method comprises providing a session between the sender and the receiver for data block transmission in using a protocol, directed to transmission in one-to-many scenario.

10. The method of claim 1, wherein said taking action to re-transmit said data block comprises sending a negative acknowledgement message from the receiver to the sender.

11. The method of claim 10, wherein file delivery is implemented in a first session and said negative acknowledgement message causes re-transmission to occur during the same first session.

12. The method of claim 10, wherein file delivery is implemented in a first session and said negative acknowledgement message causes re-transmission to occur during a session other than the first session.

13. The method of claim 12, wherein said other session is a session established after said first session has expired.

14. The method of claim 10, wherein said negative acknowledgement message comprises a request to re-transmit one or more data blocks or packets.

15. The method of claim 14, wherein said negative acknowledgement message is transmitted in the end of a transmission session, said negative acknowledgement message signifying a start of a new session in order to perform re-transmission of missed blocks.

16. The method of claim 1, wherein a session context is stored for later use.

17. The method of claim 16, wherein said session context comprises identifiers within the session, an encoding symbol identifier, a transmission session identifier, and a transmission object identifier, as well as a identifier uniquely identifying the session context itself.

18. The method of claim 1, wherein initial transmission of data blocks is performed in a File Delivery over Unidirectional Transport session and re-transmission is performed in the same ,or different File Delivery over Unidirectional Transport session or another session.

19. The method of claim 1, wherein a negative acknowledgement message is sent from a set of receivers to the sender over a point-to-point session, and a retransmission is performed over a point-to-multipoint session.

20. The method of claim 19, wherein said set of receivers comprises more than one receiver.

21. The method of claim 1, wherein re-transmission is performed by unicast transmission.

22. An apparatus comprising:
   a receiver for receiving one or more data blocks of a file from a sender in a system capable of one-to-many transmission;
   an identification and negative acknowledgement mechanism for identifying a data block of said file that is expected to be received but not received at all or incorrectly received, configured for identification of said data block on the basis of a block number, an encoding identifier and other identification information, including information of the file, wherein said information of the file includes at least one of uniform resource identifier of the file and file parameters, and
   a processor configured for taking action in order to cause re-transmission of said data block.

23. The apparatus of claim 22, wherein said other identification information comprises a set of session parameters.

24. The apparatus of claim 22, wherein said other identification information comprises a transmission object identifier.

25. The apparatus of claim 22, wherein said other identification information comprises blocking information.

26. A memory stored with program code executable by a processor in a receiving device for file delivery in a system capable of one-to-many transmission:

for causing the receiving device to receive one or more data blocks of a file from a sender;

for identifying a data block of said file that is expected to be received but not received at all or incorrectly received, said identifying performed on the basis of a block number, an encoding identifier and other identification information, including information of the file, wherein said information of the file includes at least one of uniform resource identifier of the file and file parameters, and;

for causing the receiving device to take action in order to cause re-transmission of said data block.

27. An apparatus comprising:

a transmission mechanism for transmitting one or more data blocks of a file to at least one receiver in a system capable of one-to-many transmission; and a re-transmission mechanism for re-transmitting a data block of said file that is expected to be received but not received at all or incorrectly received at the receiver, said data block having been identified on the basis of a block number, an encoding identifier and other identification information, including information of the file wherein said information of the file includes at least one of uniform resource identifier of the file and file parameters.

28. A memory stored with program code executable by a processor in a sending device for file delivery in a system capable of one-to-many transmission:

for causing the sending device to transmit one or more data blocks of a file to at least one receiver; and for causing the sending device to re-transmit a data block of said file that is expected to be received but not received at all or incorrectly received at the receiver, said data block having been identified on the basis of a block number, an encoding identifier and other identification information, including information of the file wherein said information of the file includes at least one of uniform resource identifier of the file and file parameters.

29. A system capable of one-to-many transmission, the system comprising:

a sending device configured for transferring one or more data blocks of a file from a sender to at least one receiver;

the receiver configured for identifying a data block of said file that is expected to be received but not received at all or incorrectly received at the receiver, said identifying of said data block on the basis of a block number, an encoding identifier and other identification information, including information of the file, wherein said information of the file includes at least one of uniform resource identifier of the file and file parameters, and;

the sending device configured for taking action to re-transmit said data block.

30. The system of claim 29, wherein said other identification information comprises a set of session parameters and a transmission object identifier.

31. The system of claim 29, wherein said other identification information comprises a transmission object identifier.

32. The system of claim 29, wherein said other identification information comprises blocking information.

33. An apparatus comprising:

means for receiving one or more data blocks of a file from a sender in a system capable of one-to-many transmission;

means for identifying a data block of said file that is expected to be received but not received at all or incorrectly received and, for identification of said data block on the basis of a block number, an encoding identifier and other identification information, including information of the file, wherein said information of the file includes at least one of uniform resource identifier of the file and file parameters, and;

means for taking action in order to cause re-transmission of said data block.

* * * * *

UNITED STATES PATENT AND TRADEMARK OFFICE
CERTIFICATE OF CORRECTION

PATENT NO. : 7,599,294 B2 Page 1 of 1
APPLICATION NO. : 10/778926
DATED : October 6, 2009
INVENTOR(S) : Walsh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this

Twenty-eighth Day of September, 2010

David J. Kappos
*Director of the United States Patent and Trademark Office*